(12) United States Patent
Sunamori

(10) Patent No.: US 10,268,171 B2
(45) Date of Patent: Apr. 23, 2019

(54) DEMAND RESPONSE CONTROL RESULT PRESENTATION APPARATUS

(71) Applicant: DAIKIN INDUSTRIES, LTD., Osaka-shi, Osaka (JP)

(72) Inventor: Wakiko Sunamori, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/558,142

(22) PCT Filed: Mar. 16, 2016

(86) PCT No.: PCT/JP2016/058282
§ 371 (c)(1),
(2) Date: Sep. 13, 2017

(87) PCT Pub. No.: WO2016/152669
PCT Pub. Date: Sep. 29, 2016

(65) Prior Publication Data
US 2018/0046159 A1    Feb. 15, 2018

(30) Foreign Application Priority Data
Mar. 20, 2015   (JP) ................................ 2015-058536

(51) Int. Cl.
*G06Q 30/02*    (2012.01)
*G05B 19/042*   (2006.01)
(Continued)

(52) U.S. Cl.
CPC ....... *G05B 19/042* (2013.01); *G06Q 30/0207* (2013.01); *G06Q 50/06* (2013.01);
(Continued)

(58) Field of Classification Search
CPC ....... G06Q 30/0207; G06Q 50/06; H02J 3/14; H02J 13/00; H04Q 9/00
See application file for complete search history.

(56) References Cited

U.S. PATENT DOCUMENTS 8,367,984 B2 *  2/2013  Besore ................... G06Q 50/06
                                                        219/490
8,548,638 B2 * 10/2013  Roscoe ................... H02J 3/008
                                                        700/295
(Continued)

FOREIGN PATENT DOCUMENTS

EP    2 669 861 A1    12/2013
EP    2 821 955 A1    1/2015
(Continued)

OTHER PUBLICATIONS

International Preliminary Report of corresponding PCT Application No. PCT/JP2016/058282 dated Oct. 5, 2017.
(Continued)

*Primary Examiner* — Mark A Connolly
(74) *Attorney, Agent, or Firm* — Global IP Counselors, LLP

(57) ABSTRACT

A demand response control result presentation apparatus is used in an energy consumption amount management system granting an incentive to a user of a facility device when the facility device performs a demand response control to adjust an energy consumption amount in response to a control request. The demand response control result presentation apparatus is configured to present a control result of the demand response control performed by the facility device. The demand response control result presentation apparatus includes a control result acquiring unit configured to acquire information relating to the control result, an incentive amount acquiring unit configured to acquire information relating to an amount of the incentive, and a control result presentation unit configured to present the control result. The control result corresponds to a variation in the amount of the incentive in a predetermined period.

11 Claims, 10 Drawing Sheets

(51) Int. Cl.
    *G06Q 50/06*    (2012.01)
    *H02J 3/14*    (2006.01)
    *H02J 13/00*    (2006.01)
    *H04Q 9/00*    (2006.01)

(52) U.S. Cl.
    CPC ............... *H02J 3/14* (2013.01); *H02J 13/00* (2013.01); *H04Q 9/00* (2013.01); *G05B 2219/2639* (2013.01)

(56) References Cited

U.S. PATENT DOCUMENTS

| | | | |
|---|---|---|---|
| 2010/0106342 A1* | 4/2010 | Ko | G06Q 10/04 700/295 |
| 2013/0207466 A1* | 8/2013 | Lee | H02J 4/00 307/23 |
| 2014/0088774 A1 | 3/2014 | Bruschi et al. | |
| 2015/0081413 A1 | 3/2015 | Okabe et al. | |
| 2016/0004297 A1 | 1/2016 | Kazuno et al. | |
| 2017/0132722 A1* | 5/2017 | Nikolopoulos | G06Q 50/01 |

FOREIGN PATENT DOCUMENTS

| | | |
|---|---|---|
| JP | 2002-369380 A | 12/2002 |
| JP | 2005-250523 A | 9/2005 |
| JP | 2007-257284 A | 10/2007 |
| JP | 2014-82811 A | 5/2014 |
| JP | 2014-200153 A | 10/2014 |
| JP | 2015-14876 A | 1/2015 |

OTHER PUBLICATIONS

European Search Report of corresponding EP Application No. 16 76 8572.6 dated Nov. 22, 2017.

International Search Report of corresponding PCT Application No. PCT/JP2016/058282 dated May 31, 2016.

\* cited by examiner

DEMAND RESPONSE CONTROL RESULT PRESENTATION APPARATUS

CROSS-REFERENCE TO RELATED APPLICATIONS

This U.S. National stage application claims priority under 35 U.S.C. § 119(a) to Japanese Patent Application No. 2015-058536, filed in Japan on Mar. 20, 2015, the entire contents of which are hereby incorporated herein by reference.

TECHNICAL FIELD

The present invention relates to an apparatus presenting a control result of a demand response control performed by a facility device.

BACKGROUND ART

"Demand response control" for realizing demand response (sometimes referred to below as "DR") has recently been studied. In one mode of demand response, an electric power supplier or the like grants an incentive (money, an electric bill discount, or the like) to a user of a facility device (electric power consumer) to induce adjustment of an amount of electric power consumption by the facility device, thereby contributing to stable supplying of electric power. In order to realize such demand response, the facility device performs a demand response control to adjust an electric power consumption amount (energy consumption amount) in response to a control request.

Techniques to display an incentive sum to a user who has reduced an electric power consumption amount, and other techniques, have also conventionally been studied in the technical field of electric power adjustment (see Japanese Laid-open Patent Publication No. 2005-250523, for example).

SUMMARY

Problems that the Invention is Intended to Solve

In the form of demand response described above, a gained amount of the incentive sometimes varies according to such factors as a control condition of the demand response control and a usage environment of the facility device. The gained amount of the incentive becomes unpredictable in such cases, and a situation therefore arises in which it is difficult for the user to appropriately assess whether to continue or change the control condition of the demand response control.

An object of the present invention is to provide a demand response control result presentation apparatus whereby it is possible to appropriately assess the efficiency in obtaining an incentive of demand response.

Solution to Problem

A demand response control result presentation apparatus according to a first aspect of the present invention is used in an energy consumption amount management system granting an incentive to a user of a facility device when the facility device performs a demand response control to adjust an energy consumption amount in response to a control request. The demand response control result presentation apparatus presents a control result of the demand response control performed by the facility device. The demand response control result presentation apparatus includes a control result acquiring unit, an incentive amount acquiring unit, and a control result presentation unit. The control result acquiring unit acquires information relating to the control result. The incentive amount acquiring unit acquires information relating to an amount of the incentive. The control result presentation unit presents the control result that is associated with the amount of the incentive.

In this demand response control result presentation apparatus, the control result presentation unit presents the control result so that the control result is associated with the amount of the incentive, and it is therefore possible for the user to appropriately assess the efficiency with which the incentive is gained in demand response. In other words, the user can assess whether to continue or change a control condition, and this contributes to maintaining motivation to participate in demand response, and it is also therefore possible to reduce loss of opportunities to gain the incentive.

A demand response control result presentation apparatus according to a second aspect of the present invention is the demand response control result presentation apparatus according to the first aspect, wherein the control result presentation unit presents the control result that corresponds to a variation in the amount of the incentive. Consequently, this demand response control result presentation apparatus makes it possible for the user to recognize a time period or the like where a large quantity of incentives can be gained under the same control condition.

A demand response control result presentation apparatus according to a third aspect of the present invention is the demand response control result presentation apparatus according to the first or second aspect further includes a threshold value setting unit. The threshold value setting unit receives setting of a threshold value for the control result. The control result presentation unit compares the control result and the threshold value and presents the control result in accordance with a comparison result.

Through this demand response control result presentation apparatus, by comparison with the threshold value, the user is able to easily assess the efficiency in obtaining the incentive.

A demand response control result presentation apparatus according to a fourth aspect of the present invention is the demand response control result presentation apparatus according to any of the first through third aspects, used in an energy consumption amount management system granting an incentive individually to a plurality of users corresponding to a plurality of facility devices. The control result acquiring unit acquires information relating to the control result of the demand response control performed by a facility device of another user other than a certain user. The control result presentation unit presents the control result for the certain user based on the information relating to the control result for the other user.

In this demand response control result presentation apparatus, since the control result presentation unit presents the control result for the first user on the basis of the information relating to the control result for the other user, the user can confirm the validity of an assessment for the control condition by comparing with another person.

A demand response control result presentation apparatus according to a fifth aspect of the present invention is the demand response control result presentation apparatus according to any of the first through fourth aspects, wherein the control result presentation unit presents the control results in the form of any one or a combination of a time for which the facility device performs the demand response control in a predetermined period, a number of times the facility device performs the demand response control in a predetermined period, an energy consumption amount adjusted by the demand response control performed by the facility device in a predetermined period, an amount of the incentive granted to the user by the demand response control performed by the facility device in a predetermined period, a number of control requests received by the facility device in a predetermined period, and a number of times that the facility device can respond to the control request in a predetermined period.

In this demand response control result presentation apparatus, the control result presentation unit presents the above-mentioned information as the control results, and the user can therefore be made to recognize a relationship between the details of the demand response control and the amount of the incentive. The validity of the assessment by the user can therefore be further enhanced.

A demand response control result presentation apparatus according to a sixth aspect of the present invention is the demand response control result presentation apparatus according to any of the first through fifth aspects, wherein the control result presentation unit presents the control result the amount of the incentive. The control result corresponds to at least any one of a gained amount of money per a unit energy consumption amount adjusted by the demand response control, a gained amount of money per number of times that the demand response control is performed, a discount amount of money with respect to the unit energy consumption amount paid for by the user, a discount amount of money per the number of times that the demand response control is performed with respect to the energy consumption amount paid for by the user, and a discounted amount of money paid by the user with respect to the unit energy consumption amount.

In this demand response control result presentation apparatus, the control result presentation unit presents the above-mentioned information as the amount of the incentive, and the control result can therefore be presented in accordance with the form of the incentive. The control result is presented in the form of the incentive desired by the user, and the validity of the assessment by the user can thereby be further enhanced.

Advantageous Effects of Invention

Through the demand response control result presentation apparatus according to the first aspect of the present invention, it is possible for the user to appropriately assess the efficiency in obtaining the incentive of demand response.

Through the demand response control result presentation apparatus according to the second aspect of the present invention, it is possible for the user to recognize the time period in which a large quantity of incentives or other information can be gained under the same control condition.

Through the demand response control result presentation apparatus according to the third aspect of the present invention, by comparison with the threshold value, the user is able to easily assess the efficiency in obtaining the incentive.

Through the demand response control result presentation apparatus according to the fourth aspect of the present invention, the validity of the assessment for the control condition can be tested by the user through comparison with another person.

Through the demand response control result presentation apparatus according to the fifth aspect of the present invention, the user can be made to recognize the relationship between the details of the demand response control and the amount of the incentive.

Through the demand response control result presentation apparatus according to the sixth aspect of the present invention, the control result can be presented in accordance with the form of the incentive.

DESCRIPTION OF EMBODIMENTS

Figure 1:
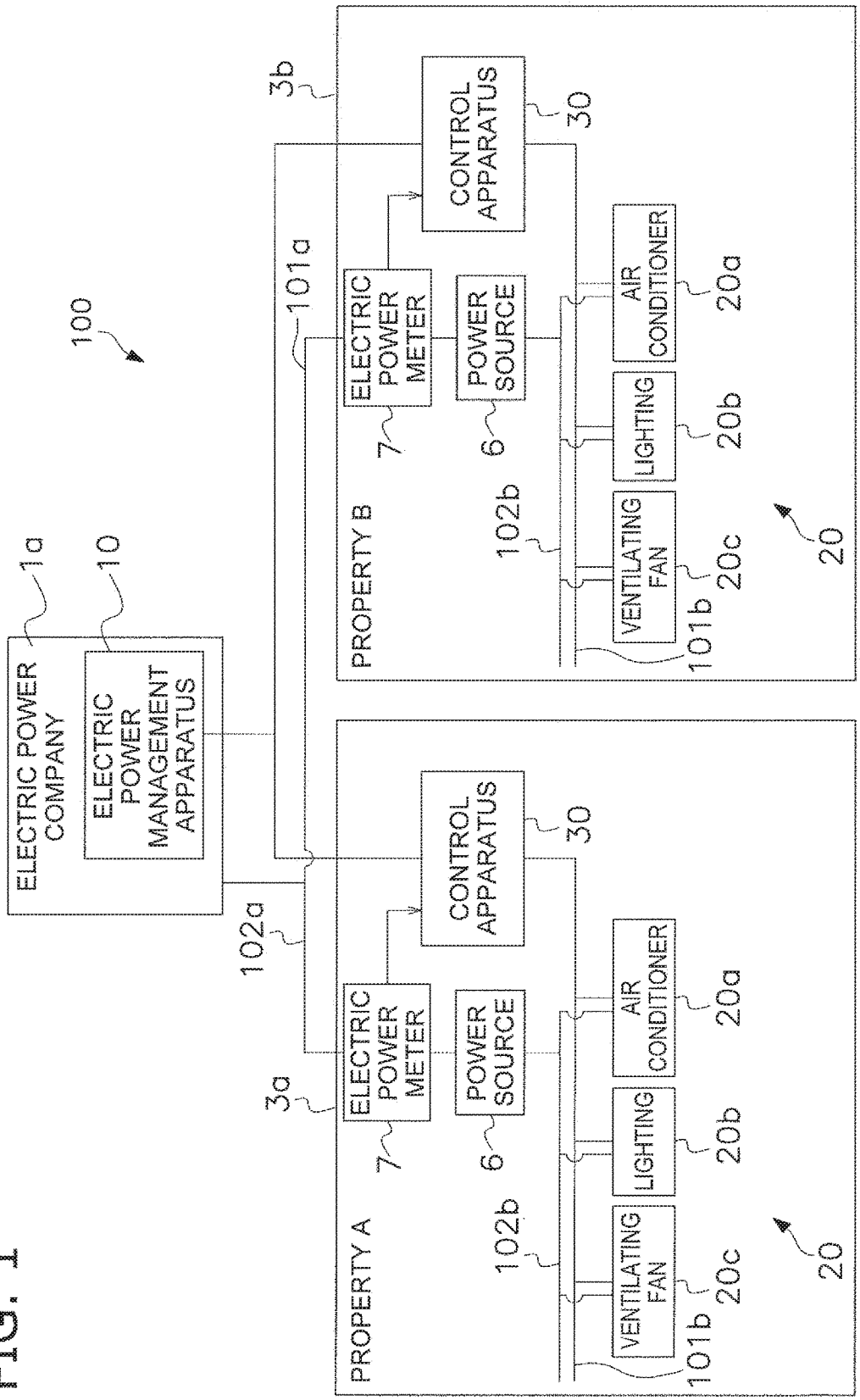
FIG. 1 is a schematic diagram illustrating an energy consumption management system according to a first embodiment.

First Embodiment (1) Overall Configuration of Energy Consumption Management System FIG. 1 is a schematic diagram illustrating an energy consumption management system according to a first embodiment of the present invention. To facilitate understanding in the following description, the energy consumed by a facility device 20 is assumed to be electrical energy.

An energy consumption management system is an arrangement in which an incentive is granted to a user of a facility device 20 when the facility device adjusts an energy consumption amount for a predetermined adjustment period in response to a control request from an electric power company 1a. This energy consumption management system grants incentives individually to a plurality of users corresponding to a plurality of facility devices. The electric power company 1a and the user enter into a contract in advance in which an agreement relating to use of electric power is established, and a form of the incentive is also determined in advance on the basis of the contract. The energy consumption management system such as described above is realized by the electric power company 1a as an electric power supplier and by each of the apparatuses installed in each of the properties A, B as consumers.

The electric power company 1a has an electric power management apparatus 10. The electric power management apparatus 10 sends a "control request" to induce energy adjustment to each facility device 20. The electric power management apparatus 10 also calculates an amount of the incentive to be granted to the user based on a record or the like of a response by the facility device 20 to the control request. The electric power management apparatus 10 is installed not only at the electric power company 1a, but also sometimes in an aggregator, which is a lower-level electric power supplier.

Installations 3a, 3b at the properties A, B are buildings such as office buildings, tenant buildings, factories, ordinary homes, and the like, for example. The facility device 20, a power source 6 to supply electric power to the facility device 20, an electric power meter 7 to measure an amount of electric power supplied from the power source 6 to the facility device 20, and a control apparatus 30 to control the facility device 20 are installed in each property A, B. Electric power is supplied from the electric power company 1a through a power source line 102a to the installations 3a, 3b of the properties A, B. Electric power is supplied from the power source 6 to the facility device 20 in the same property via an indoor power source line 102b. The electric power management apparatus 10 and the control apparatus 30 are connected by the Internet 101a, for example. The control apparatus 30 and the facility device 20 in the same property are connected by a dedicated control wire 101b or the like.

A limited number of properties A, B and/or apparatuses is illustrated in FIG. 1, but the number thereof is not actually limited in the present invention.

(2) Apparatuses Used in the Energy Consumption Management System (2-1) Electric Power Management Apparatus 10

Figure 2:
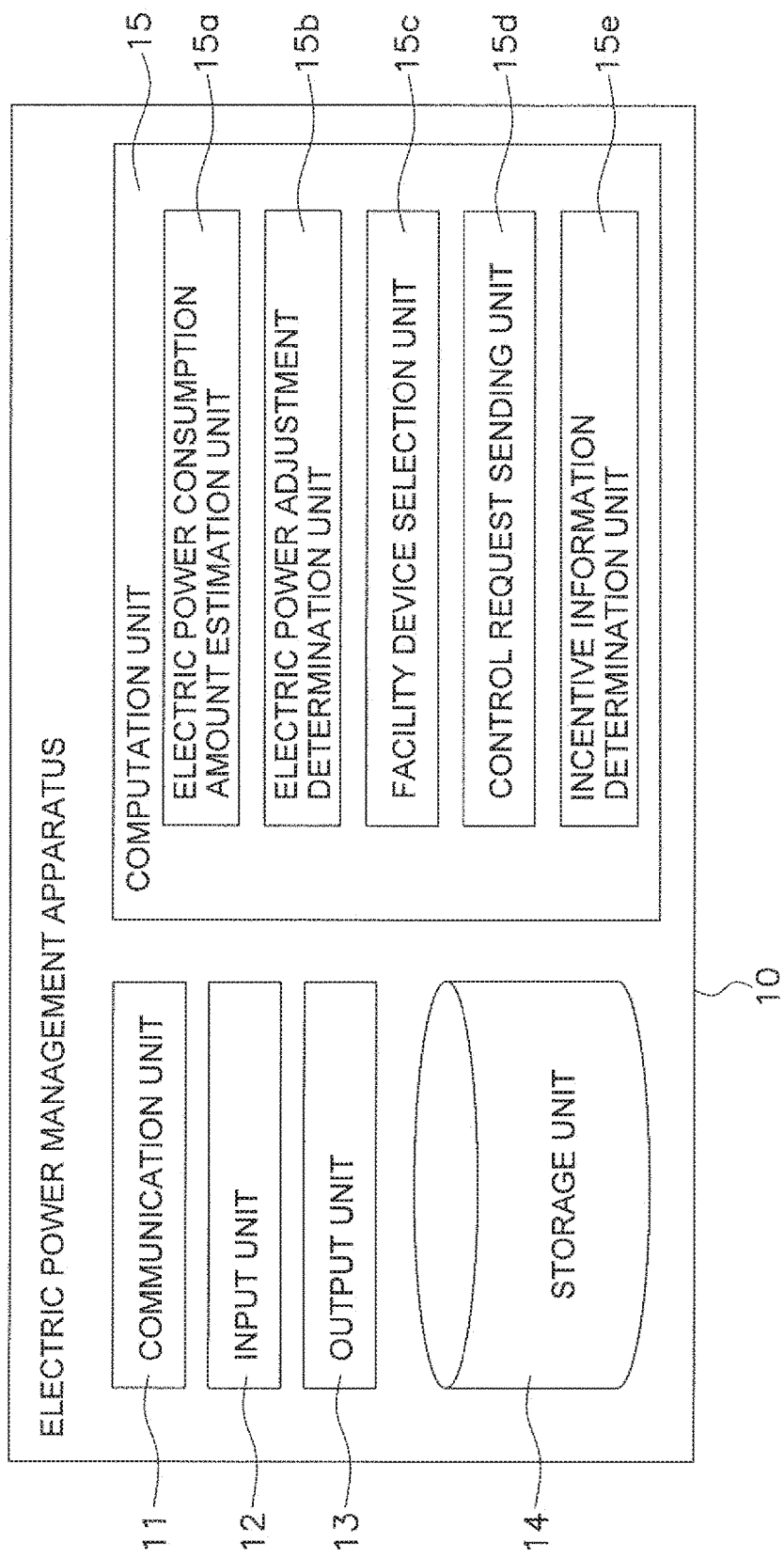
FIG. 2 is a schematic diagram illustrating a configuration of an electric power management apparatus 10 according to the first embodiment.

FIG. 2 is a schematic diagram illustrating a configuration of the electric power management apparatus 10. The electric power management apparatus 10 includes a communication unit 11, an input unit 12, an output unit 13, a storage unit 14, and a computation unit 15.

The communication unit 11 communicates with the control apparatus 30, and is configured from a network interface or the like to enable connection to the Internet 101a.

The input unit 12 inputs information to the electric power management apparatus 10, and is configured from an operating button, a keyboard, a mouse, or the like.

The output unit 13 outputs information stored in the electric power management apparatus 10 and other information, and is configured from a display or the like.

Figure 3:
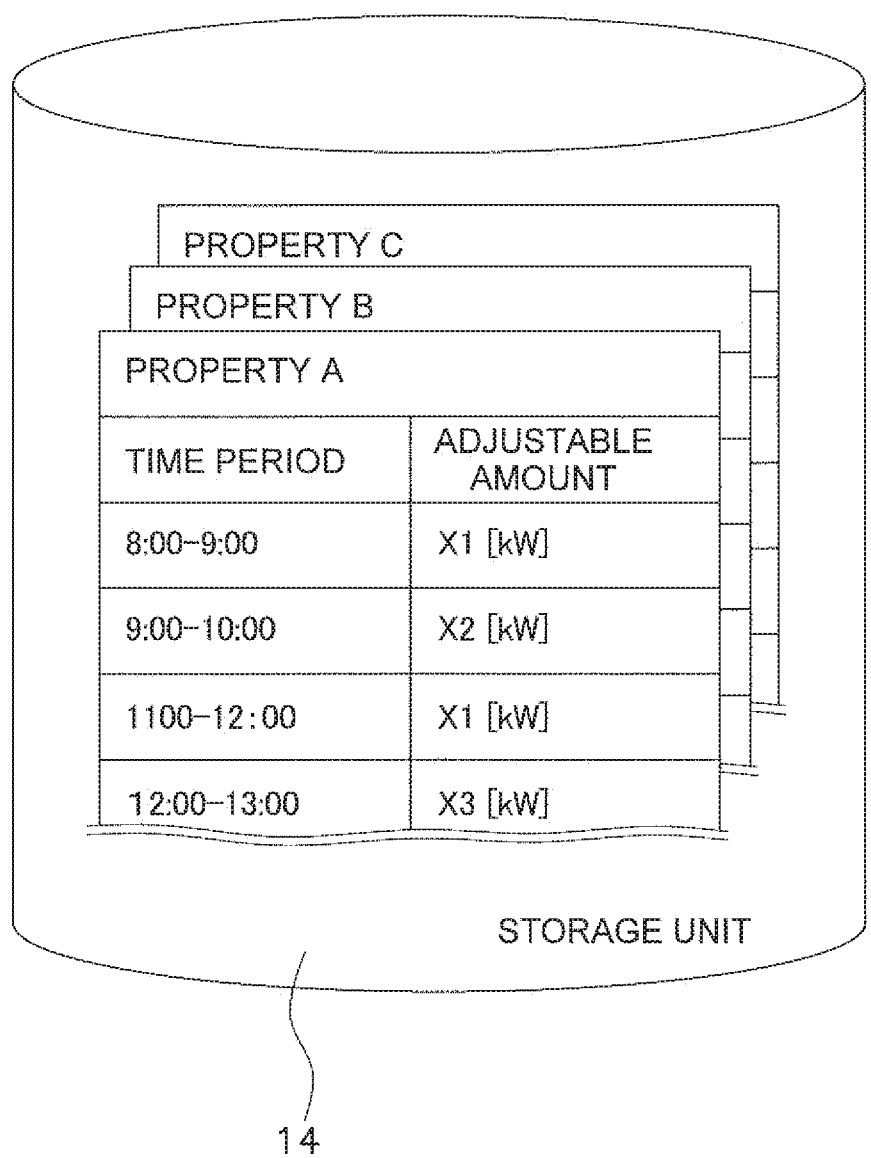
FIG. 3 is a schematic diagram illustrating a configuration of a storage unit 14 according to the first embodiment.

The storage unit 14 stores information inputted to the electric power management apparatus 10 and oilier information, and is configured from a hard disk or the like. As illustrated in FIG. 3, the storage unit 14 stores combinations of adjustable electric power amounts and adjustable time periods for the properties A, B, and the like. The storage unit 14 also stores a program executed by the computation unit 15 and other information.

The computation unit 15 executes various types of computation on the basis of the information stored in the electric power management apparatus 10 and other information, and is configured from a CPU, ROM, RAM, and the like. The computation unit 15 functions as an electric power consumption amount estimation unit 15a, electric power adjustment determination unit 15b, facility device selection unit 15c, control request sending unit 15d, and incentive information determination unit 15e, illustrated in FIG. 2, by reading and executing a program stored in the storage unit 14.

The electric power consumption amount estimation unit 15a estimates a supplied amount and demanded amount of electric power and estimates an amount of electric power consumed after a predetermined time. The electric power consumption amount estimation unit 15a also determines whether or not there is a possibility of the demanded amount of electric power after the predetermined time exceeding a predetermined supplied amount of electric power.

The electric power adjustment determination unit 15b determines an adjustment time, an adjustment period, and an amount of adjustment necessary to reduce consumption of electric power when, the electric power consumption amount estimation unit 15a determines that there is a possibility of the demanded amount of electric power after the predetermined time exceeding the predetermined supplied amount of electric power.

The facility device selection unit 15c selects a facility device 20 to perform a demand response control on the basis of information of the facility device 20 stored in the storage unit 14 and the necessary information to reduce electric power consumption determined by the electric power adjustment determination unit 15b.

The control request sending unit 15d sends, to the control apparatus 30 selected by the facility device selection unit 15c, the "control request" to induce adjustment of an amount of electric power used. An electric power amount to be adjusted, a time period, and other information is included in the control request. Note that, depending on the specifics of the contract between the supplier and the user, the electric power amount to be adjusted may sometimes be agreed upon in advance. In such case, the sending the information related to the electric power amount to be adjusted may be omitted.

The incentive information determination unit 15e determines information relating to the amount of the incentive to be granted to the user. The amount of the incentive is given by the product of the electric power adjustment amount and an incentive unit value, for example. The incentive information determination unit 15e changes the incentive unit value or the like in accordance with a condition. When the incentive unit value or the like is changed, the incentive information determination unit 15e sends, to the control apparatus 30 via the communication unit 11, the changed incentive unit value or the like as "information relating to the amount of the incentive."

(2-2) Facility Device 20

The facility device 20 is a device operating under a control condition set by the control apparatus 30. The facility device 20 operates under a control condition satisfying the control request from the electric power management apparatus 10, and the electric power consumption amount is thereby adjusted in the energy consumption management system.

An air conditioner 20a, lighting 20b, a ventilation fan 20c, and the like are included as types of the facility device 20. The electric power consumed in an operating state of the air conditioner 20a differs according to a difference between an air-cooling mode/air-warming mode or other operating mode, a difference between set temperatures, or a difference in outside air temperature or other environmental factors. The lighting 20b includes configurations that are operated to be only ON or OFF and where consumption of electric power is constant in the operating state, as well as configurations of which illuminance is switched in multi-stage fashion and where consumption of electric power differs for each operation. The ventilation fan 20c is operated to be only ON or OFF, and consumption of electric power by the ventilation fan 20c is constant in the operating state.

(2-3) Control Apparatus 30

Figure 4:
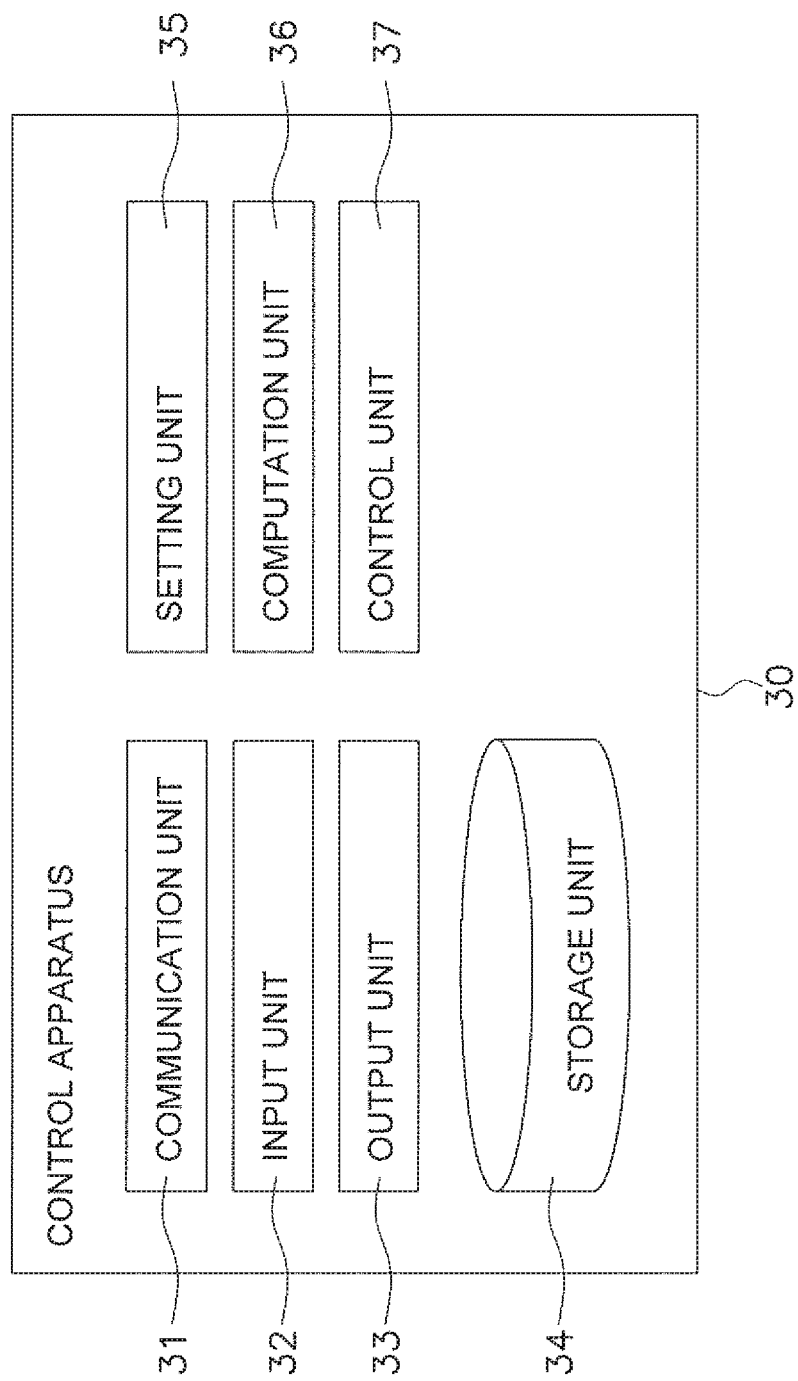
FIG. 4 is a schematic diagram illustrating a configuration of a control apparatus 30 according to the first embodiment.

FIG. 4 is a schematic diagram illustrating a configuration of the control apparatus 30. The control apparatus 30 is used in the energy consumption management system, and controls the facility device 20. The control apparatus 30 includes a communication unit 31, an input unit 32, an output unit 33, a storage unit 34, a setting unit 35, a computation unit 36, and a control unit 37.

The communication unit 31 communicates with the electric power management apparatus 10, and is configured from a network interface or the like to enable connection to the Internet 101a. The communication unit 31 (incentive amount acquiring unit) acquires, from the electric power management apparatus 10, the "information relating to the amount of the incentive" in the demand response control. The information relating to the amount of the incentive acquired by the communication unit 31 is written to the storage unit 34 described later.

The input unit 32 inputs information to the control apparatus 30, and is configured from an operating button and a touch screen covering a display of the output unit 33, or the like. Various kinds of commands such as for changing an operating mode and changing a setting for the facility device 20 can be inputted via the input unit 32.

The output unit 33 outputs information and the like stored in the control apparatus 30, and is configured from a display or the like. For example, the display of the output unit 33 outputs a screen image indicating an operating condition of the facility device 20, and displays the ON/OFF status, an operating mode (e.g., air-cooling mode/air-warming mode or the like in the case of the air conditioner 20a), set temperature, illuminance, ventilation volume, running time, availability factor, and other information relating to operating ability during running of the facility device 20, the current electric power consumption, and the like. The display of the output unit 33 furthermore displays a control result of the demand response control. The form of display by the display of the output unit 33 will be described in detail hereinafter.

The storage unit 34 stores information inputted to the control apparatus 30 and other information, and is configured from a hard disk or the like. The storage unit 34 also stores a program that can be read and executed by the computation unit 36 described later. The storage unit 34 furthermore stores the control condition and electric power consumption information, depending on the type of facility device 20. The term "control condition" refers to a condition for when the control apparatus 30 controls the facility device 20. For example, output information for controlling the air conditioner 20a in order to attain a predetermined set temperature or other information is stored as the control condition. In an initial state, the control condition is set in advance. The storage unit 34 also stores the "information relating to the amount of the incentive" acquired by the communication unit 31. The storage unit 34 also stores a "threshold value" set by the input unit 32. The storage unit 34 also stores "information relating to a control result" of the demand response control already executed by the facility device 20.

The setting unit 35 sets the control condition of the facility device 20 on the basis of information inputted from the input unit 32 and other information. When the setting unit 35 changes the control condition of the demand response control, a gained amount of an incentive obtained from the control result of the demand response control is changed.

The computation unit 36 executes various types of computation on the basis of the information stored in the control apparatus 30 and other information, and is configured from a CPU, ROM, RAM, and the like. A function of the computation unit 36 is realized by reading and executing a program stored in the storage unit 34 described above. The computation unit 36 has a function of calculating the gained amount of the incentive on the basis of the control condition set by the setting unit 35. The computation unit 36 also generates information outputted to the display of the output unit 33. Specifically, the computation unit 36 generates screen image information to present the control result of the demand response control so that the control result corresponds to a variation in the amount of the incentive.

The control unit 37 controls the facility device 20 on the basis of the control condition set by the setting unit 35 or other information.

(3) Operation of the Control Apparatus 30

In the control apparatus 30 according to the present embodiment, when a presentation command to present the control result or other information is inputted from the user via the input unit 32, the control result is displayed in the display of the output unit 33. Display of the control result is independent of the inputting of the presentation command, and may be performed at any timing, such as upon activation of the power source of the control apparatus 30, touching of a touch screen configuring the input unit 32 and the output unit 33, or acquisition of information from the electric power management apparatus 10.

Figure 5:
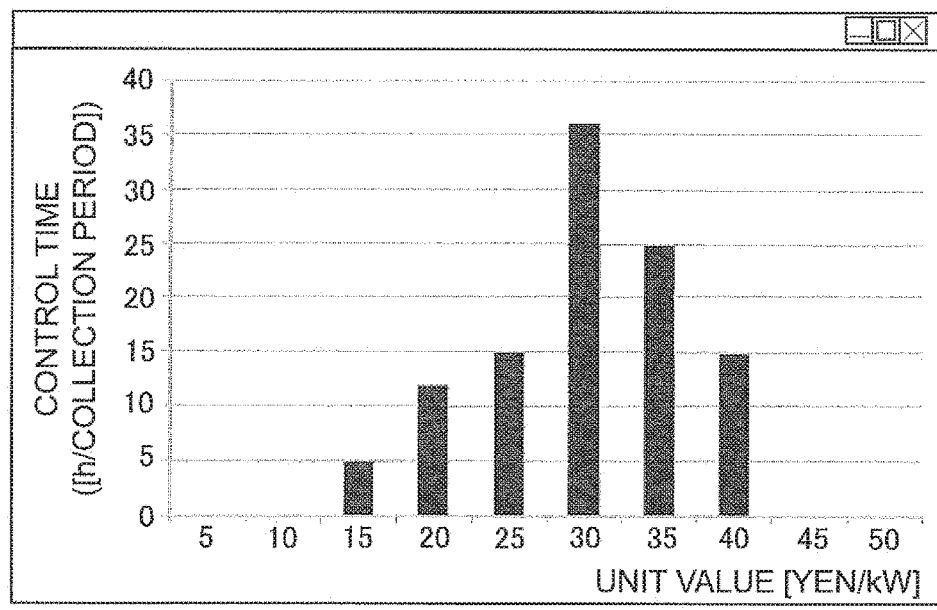
FIG. 5 illustrates an example of a display screen image of a control result of DR control.

FIG. 5 illustrates an example of a display screen image of a control result of DR control. In FIG. 5, the horizontal axis indicates the unit value ([yen/kW]) of the incentive per the electric power consumption amount adjusted by the DR control, and the vertical axis indicates (a1) a control time ([h/collection period]) for which the facility device performs the demand response control in a predetermined period. However, the control result of the DR control is not limited to the above, and (a2) a control count that is the number of times the facility device performs demand response control in a predetermined period, (a3) the electric power consumption amount ([kWh/collection period]) adjusted by the demand response control performed by the facility device in a predetermined period, (a4) the amount of the incentive granted to the user by the demand response control performed by the facility device in a predetermined period, (a5) a request count indicating the number of control requests received by the facility device in a predetermined period, (a6) a control-possible count indicating the number of times that the facility device can respond to a control request in a predetermined period, or other control results may be adopted.

The control apparatus 30 outputs a display screen image such as the display screen image illustrated in FIG. 5, and the user is therefore able to accurately assess whether the incentive from the DR control has been efficiently gained. For example, the incentive would be considered efficiently gained when the DR control is performed for a long time in a time period in which the unit value of the incentive is high, or when the DR control is performed so that the adjusted electric power consumption amount is large in a time period in which the unit value of the incentive is high.

Figure 6:
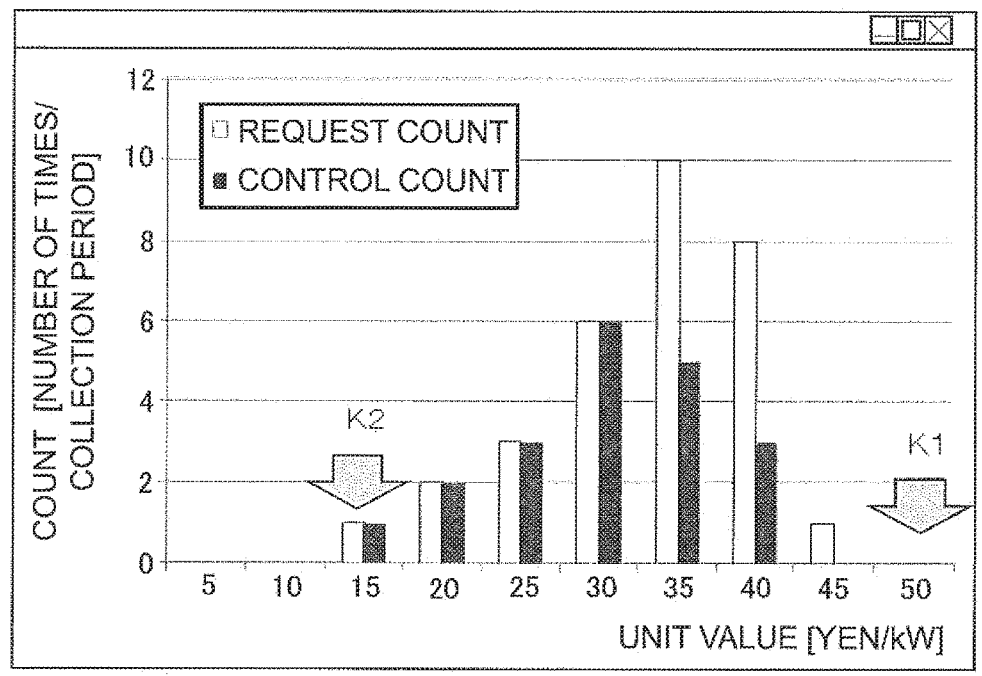
FIG. 6 illustrates an example of a display screen image of a control result of DR control.

Furthermore, the control apparatus 30 can also display a combination of the various information described above, as illustrated in FIGS. 6 and 7. For example, the request count (a5) and the control count (a2) are displayed simultaneously, as illustrated in FIG. 6. In FIG. 6, the shaded portions represent the control counts, and the outlined portions represent the request counts.

Since the control apparatus 30 outputs a display screen image such as the display screen image illustrated in FIG. 6, the user can identify an improvement point of the control details of the DR control. For example, in the region indicated by an arrow K1 in FIG. 6 where the incentive unit value is high, the displayed control count for the DR control is zero, but the displayed request count is also zero. The user can thereby be made to recognize whether there was no control request originally, or whether control could not be performed or was not performed even though there was a control request in this region. Here, the user can be made to recognize that because the request count is zero, there was no control request originally, and the incentive could not possibly be gained in such a condition. The user can also be made aware of an opportunity loss in a case in which there was a control request but control was not performed. Meanwhile, in the portion indicated by an arrow K2 in FIG. 6 in which the unit value is low, the user sees that the number of requests for the DR control is small but not zero. In general, comfort in an area surrounding the facility device is compromised when the DR control is performed. Consequently, the user can be made to recognize whether there is a need to sacrifice comfort when the incentive is low.

Figure 7:
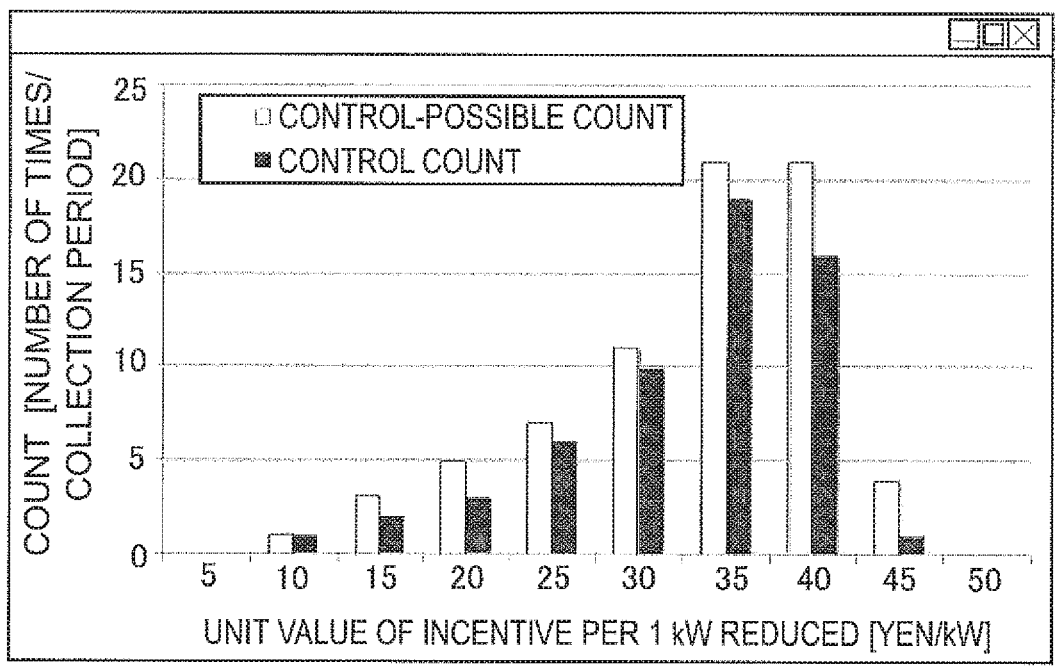
FIG. 7 illustrates an example of a display screen image of a control result of DR control.
Figure 8:
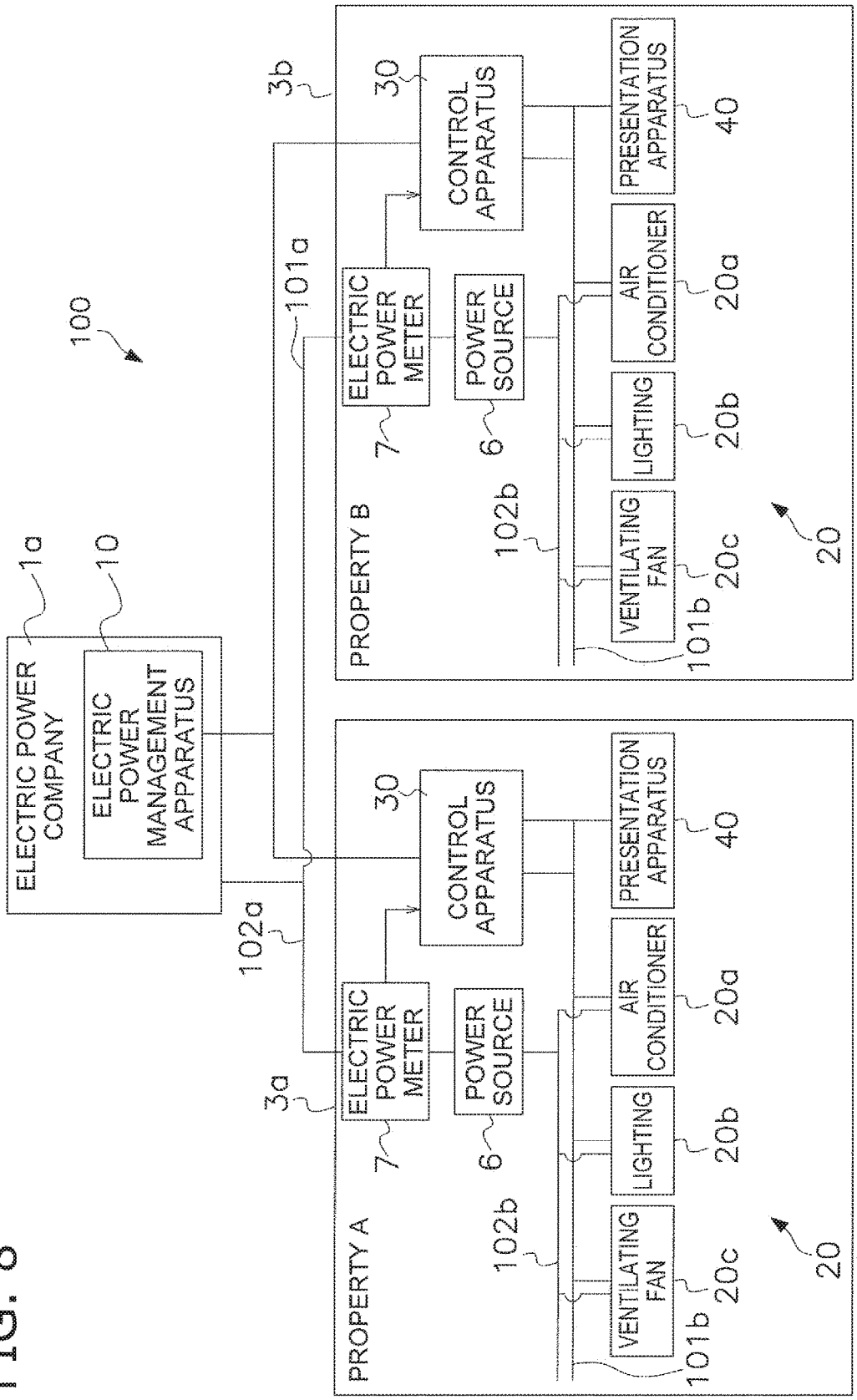
FIG. 8 is a schematic diagram illustrating an energy consumption management system according to Modification 1D.

FIG. 7 illustrates an example in which the control-possible count (a6) and the control count (a2) are displayed simultaneously. In FIG. 7, the shaded portions represent the control counts, and the outlined portions represent the control-possible counts. The same argument holds in this case as in that of FIG. 6, and the user can readily assess whether the incentive is gained with suitable efficiency.

(4) Features (4-1)

The control apparatus (demand response control result presentation apparatus) 30 according to the present embodiment is used in an energy consumption amount management system granting the incentive to the user of the facility device 20 when the facility device 20 performs the demand response control to adjust the energy consumption amount in response to the control request. The control apparatus 30 presents the control result of the demand response control performed by the facility device 20. The control apparatus 30 includes the communication unit 31 (control result acquiring unit, incentive amount acquiring unit), the output unit 33, and the computation unit 36 (control result presentation unit). The communication unit 31 acquires information relating to the control result. The communication unit 31 also acquires information relating to the amount of the incentive. The computation unit 36 generates information for presenting the control result that is associated with the amount of the incentive. The output unit 33 presents the information generated by the computation unit 36.

Consequently, in the control apparatus 30, the output unit 33 presents the control result so that the control result is associated with the amount of the incentive, and it is therefore possible for the user to appropriately assess the efficiency in obtaining the incentive of demand response. In other words, the user can assess whether to continue or change the control condition, and it is therefore possible to maintain motivation to participate in demand response and/or reduce loss of opportunities to gain incentives.

(4-2)

In the control apparatus 30, the output unit 33 presents the control result so that the control result corresponds to the variation in the amount of the incentive. Consequently, this control apparatus 30 makes it possible for the user to recognize a time period in which a large quantity of incentives can be gained under the same control condition, or other information.

(4-3)

In the control apparatus 30, the output unit 33 presents, as the control results, one or a combination of (a1) the control time ([h/collection period]) for which the facility device 20 performs the demand response control in a predetermined period, (a2) a control count which is the number of times the facility device 20 performs the demand response control in a predetermined period, (a3) the electric power consumption amount ([kWh/collection period]) adjusted by the demand response control performed by the facility device 20 in a predetermined period, (a4) the amount of the incentive granted to the user by the demand response control performed by the facility device 20 in a predetermined period, (a5) the request count indicating the number of control requests received by the facility device 20 in a predetermined period, and (a6) the control-possible count indicating the number of times that the facility device 20 can respond to the control request in a predetermined period. The output unit 33 presents the abovementioned information as the control results, and the user can therefore be made to recognize a relationship between the details of the demand response control and the amount of the incentive. The validity of an assessment by the user can therefore be further enhanced.

(5) Modifications (5-1) Modification 1A

The control apparatus 30 according to the present embodiment may be configured to receive setting of a threshold value for the control result of the demand response control via the input unit 32 (threshold value setting unit). Here, the set threshold value is stored in the storage unit 34. When the threshold value is set, the computation unit 36 compares the control result and the threshold value and generates the screen image information to present the control result of the DR control in accordance with a comparison result. The output unit 33 then displays the generated screen image information in the display. Here, the screen image information may be generated to present the control result in a level format such as "GOOD!/BAD . . . " with respect to being more than/less than the set threshold value. Through this control apparatus 30, the control result is presented by comparison with the threshold value, and the user is therefore able to easily assess the efficiency in obtaining an incentive.

(5-2) Modification 1B

In the present embodiment, the output unit 33 may display not only the information items (a1) through (a6) described above, but also various types of count information described below as the control results of the DR control. Specifically, information may be displayed which is obtained by subdividing the request count indicating the number of control requests received by the facility device. The "request count (a5)" can be categorized with a focus on whether the facility device can respond to the control request. An (a51) control-possible count indicating the number of times the facility device can respond to the control request and an (a52) control-impossible count indicating the number of times the facility device cannot respond to the control request are accordingly displayed as categories, for example. The request count can also be categorized with a focus on response to the control request. An (a53) control count which is the number of times the facility device performs the demand response control in response to the control request, and an (a54) rejection count which is the number of times the demand response control was not performed are accordingly displayed as categories, for example. The request count can also be categorized with a focus on opportunities to gain the incentive. An (a55) number of times the full amount of the incentive is gained, an (a56) number of times the incentive is partially gained, and an (a57) number of losses of an opportunity to gain the incentive in accordance with a standard set by the user are accordingly displayed as categories, for example. The request count can also be categorized with a focus on the presence or absence of a penalty corresponding to whether the control details of the DR control satisfy a standard set in advance. An (a58) number of times the standard is satisfied and an (a59) number of times the standard is not satisfied are accordingly displayed as categories. The request count can also be categorized with a focus on success or failure with respect to the standard set by the user. An (a60) number of times the standard is satisfied and an (a61) number of times the standard is not satisfied are accordingly displayed as categories.

(5-3) Modification 1C

In the present embodiment, the amount of the incentive may be defined not only as a (b1) gained amount of money ([yen/kW]) per electric power consumption amount adjusted by the DR control, but as the amounts described below, for example. Specifically, the amount of the incentive may be defined as any of a (b2) gained amount of money ([yen/number of times]) per number of times that the demand response control is performed, a (b3) discount amount of money ([yen/kW]) with respect to a unit energy consumption amount for which the user pays, a (b4) discount amount of money ([yen/number of times]) per number of tunes that the demand response control is performed with respect to the energy consumption amount for which the user pays, or a (b5) discounted amount of money ([yen/kW]) with respect to the unit energy consumption amount for which the user pays. The control result is presented in the form of the incentive desired by the user, and the validity of the assessment by the user can thereby be further enhanced.

(5-4) Modification 1D

In the present embodiment, a configuration is adopted in which the output unit 33 of the control apparatus 30 presents the control result of the DR control. However, a configuration may be adopted in which a presentation apparatus 40 presenting the control result of the DR control is provided separately from the control apparatus 30. Through such a configuration, the user can confirm the control result of the DR control regardless of the location in which the control apparatus 30 is installed.

(5-5) Modification 1E

Figure 9:
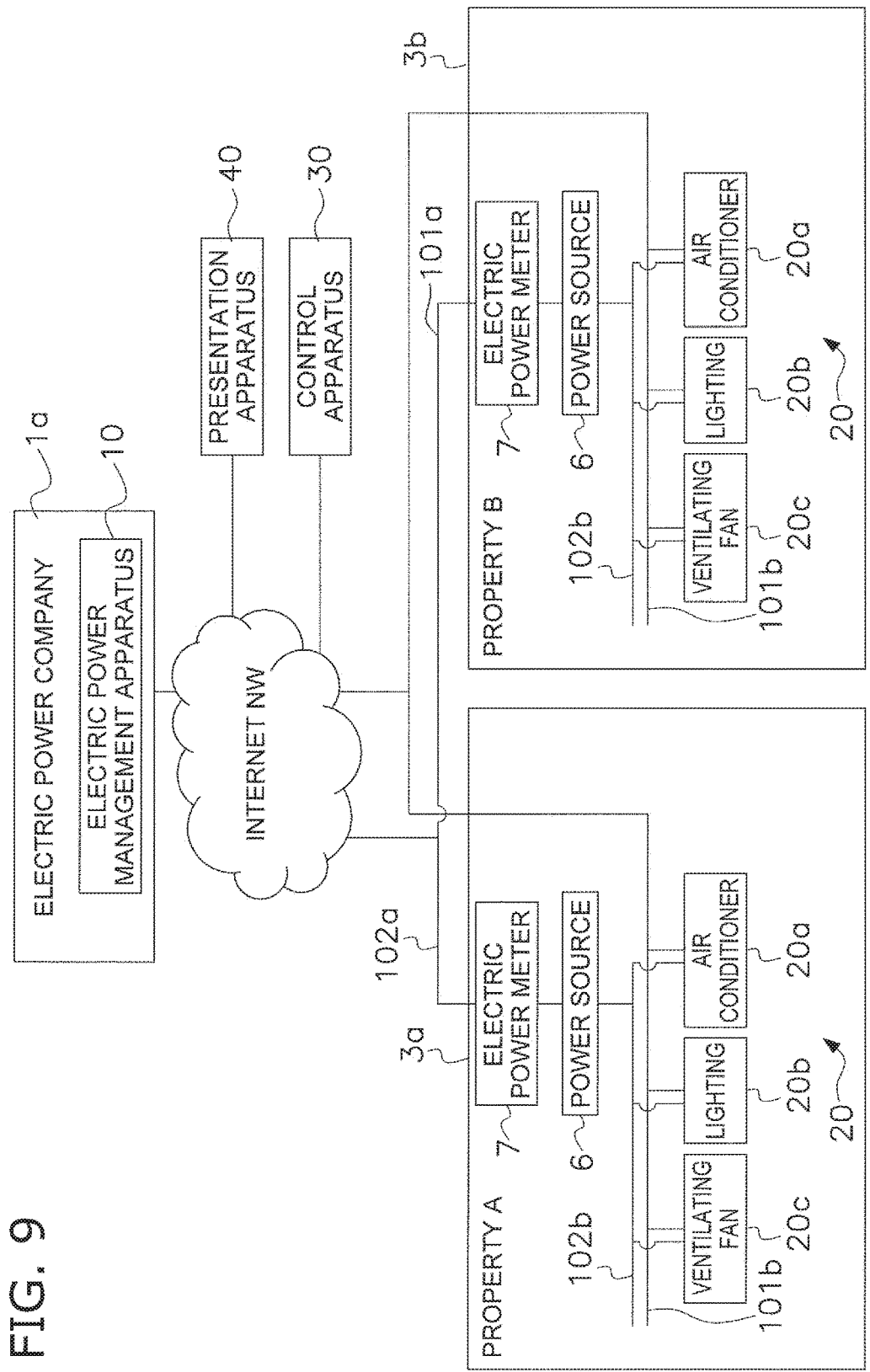
FIG. 9 is a schematic diagram illustrating an energy consumption management system according to Modification 1E.

The control apparatus 30 may also be connected to the facility device 20 via a network NW. The presentation apparatus 40 presenting the control result of the DR control may also be provided separately from the control apparatus 30. For example, the apparatuses may be in a cloud configuration via the Internet or the like, as illustrated in FIG. 9. The presentation apparatus 40 is connected to each apparatus via the network, and the user can therefore confirm the control result of the DR control at any location.

Second Embodiment (1) Apparatuses Used in the Energy Consumption Management System In the description below, portions that are the same as portions already described are referred to by substantially the same reference numerals, and no redundant descriptions thereof will be given.

(1-1) Electric Power Management Apparatus 10A

Figure 10:
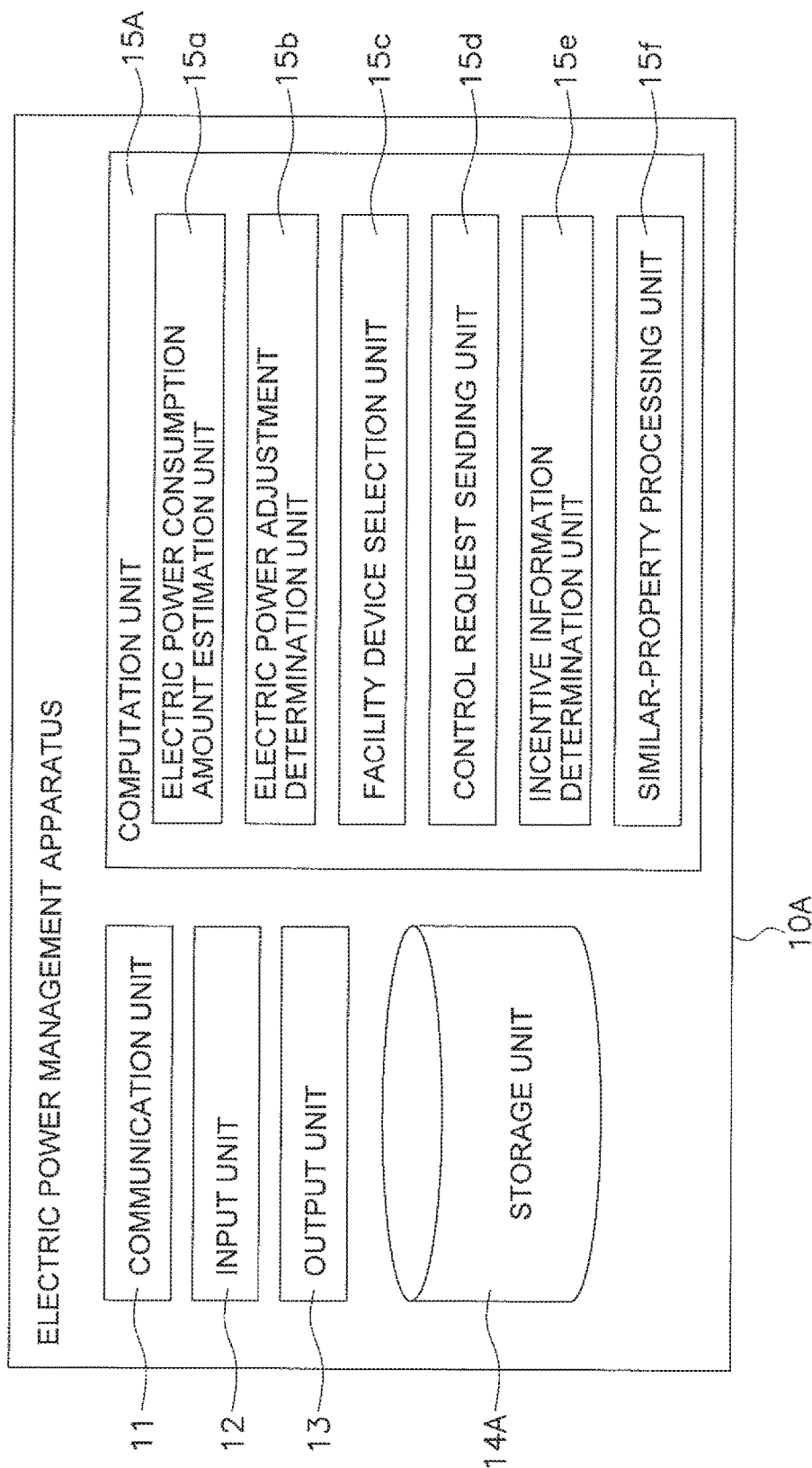
FIG. 10 is a schematic diagram illustrating a configuration of an electric power management apparatus 10A according to a second embodiment of the present invention.

FIG. 10 is a schematic diagram illustrating a configuration of an electric power management apparatus 10A according to a second embodiment of the present invention.

The electric power management apparatus 10A includes a storage unit 14A and a computation unit 15A in addition to the configuration of the electric power management apparatus 10 described above.

The storage unit 14A stores the control result of the demand response control executed by the facility devices 20 installed in properties A, B, . . . . The storage unit 14A also stores, for each property, the incentive amount corresponding to the control result of the demand response control.

The computation unit 15A also functions as a similar-property processing unit 15$f$.

The similar-property processing unit 15$f$ classifies the control result of the demand response control of another property stored in the storage unit 14A and sets the other property as a similar property. Specifically, a similar property is set from the aspects as the contract type and/or regional location of each property A, B, . . . , the property type (detached house/multiple-dwelling complex) thereof, and the past electric power usage thereof. When there is a "transmission request" for the control result of the demand response control in a similar property from a control apparatus 30A installed in a specific property A, the similar-property processing unit 15$f$ collects the control result of the demand response control of a similar property other than the property A and performs statistical processing. Specifically, the similar-property processing unit 15$f$ calculates an average value, a most frequent value, a maximum value, a minimum value, and other statistical values. The calculated statistical values are stored in the storage unit 14A as a "control result of the DR control in the similar property."

(1-2) Control Apparatus 30A

In addition to the configuration of the control apparatus 30 described above, the control apparatus 30A has a function of sending the transmission request for the "control result of the DR control in the similar property" to the electric power management apparatus 10A. The control apparatus 30A thereby acquires the "control result of the DR control in the similar property" from the electric power management apparatus 10A. The control apparatus 30A also has a function of displaying the "control result of the DR control in the similar property" together with the control result of the DR control of a user's property in the display of the output unit 33.

(2) Operation of the Control Apparatus 30A

The control apparatus 30A according to the present embodiment sends the transmission request for the "control result of the DR control in the similar property" to the electric power management apparatus 10A via the communication unit 31 and the input unit 32. The control apparatus 30A acquires the "control result of the DR control in the similar property" from the electric power management apparatus 10A and displays the control result in the display of the output unit 33. Sending the transmission request is independent of operation via the input unit 32, and may be performed at any timing, such as upon activation of the power source of the control apparatus 30A, or touching of a touch screen configuring the input unit 32 and the output unit 33.

Figure 11:
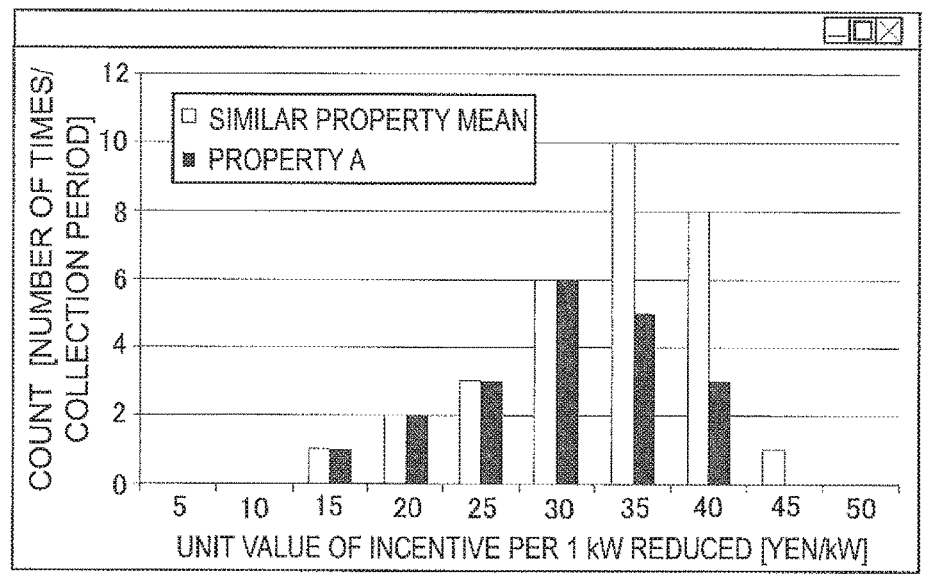
FIG. 11 illustrates an example of a display screen image of a control result of DR control.
Figure 12:
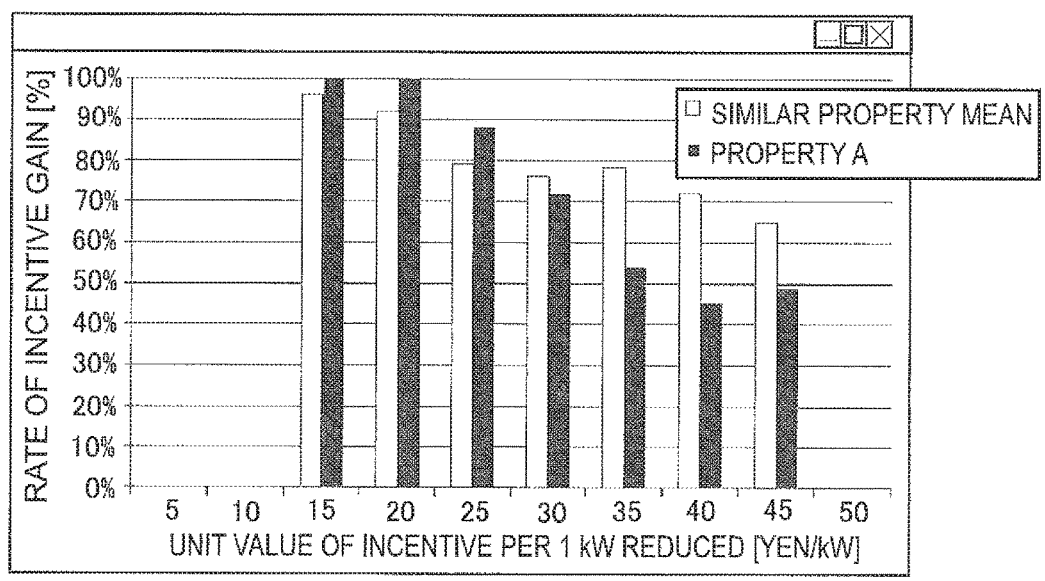
FIG. 12 illustrates an example of a display screen image of a control result of DR control.

FIGS. 11 and 12 illustrates examples of display screen images of the control results of the DR control. In FIG. 11, the horizontal axis indicates the unit value ([yen/kW]) of the incentive per the electric power consumption amount adjusted by the DR control, and the vertical axis indicates the number of times that the demand response control is performed. In FIG. 12, the horizontal axis indicates the unit value ([yen/kW]) of the incentive per the electric power consumption amount adjusted by the DR control, and the vertical axis indicates a rate ([%]) at which the incentive is gained.

Since the control apparatus 30A outputs a display screen image such as the display screen images illustrated in FIGS. 11 and 12, the user can be made to recognize a difference between the control results in the user's property and a similar property. As a result, the user becomes able to accurately assess the validity of the details of the DR control.

(3) Features

The control apparatus 30A according to the present embodiment is used in an energy consumption amount management system granting incentives individually to a plurality of users corresponding to a plurality of facility devices. The communication unit 31 (control result acquiring unit) acquires information relating to the control result of the demand response control performed by the facility device 20 of another user other than a certain user. The output unit 33 and the computation unit 36 (control result presentation unit) present the control result for the first user on the basis of the information relating to the control result for the other user.

In this control apparatus 30A, since the output unit 33 presents the control result for the first user on the basis of the information relating to the control result for the other user, the user can confirm the validity of the assessment for the control condition by comparing with another person.

(4) Modifications (4-1) Modification 2A

In the present embodiment, the similar-property processing unit 15f performs statistical processing of the control result of the DR control for the similar property other than the property A from which the "transmission request" is sent. However, statistical processing of the control result of the DR control may be performed for the result of the similar property including that of the property A. The control result of the DR control for the similar property can thereby be collected and statistically processed without waiting for the "transmission request" from the specific property A, and a computational load in the electric power management apparatus 10A can therefore be reduced.

(4-2) Modification 2B

In the present embodiment, the electric power management apparatus 10A includes the similar-property processing unit 15f and is configured so as to collect a control result for each similar property and perform statistical processing thereof. However, a configuration may also be adopted whereby necessary information is gathered on each control apparatus 30A side, and the control results are collected for each similar property and subjected to statistical processing.

<Additional Remarks>

The present invention is not limited to the embodiments as described above. In an implementation phase of the present invention, the present invention can be realized with modifications to the constituent elements thereof in a range not departing from the gist of the present invention. Various inventions can also be formed from the present invention by appropriate combinations of the plurality of constituent elements disclosed in the above embodiments. For example, some constituent elements may be omitted from the set of all constituent elements described in the embodiments. Furthermore, constituent elements may be appropriately combined with different embodiments.

What is claimed is:

1. A demand response control result presentation apparatus used in an energy consumption amount management system granting an incentive to a user of a facility device when the facility device performs a demand response control to adjust an energy consumption amount in response to a control request, the demand response control result presentation apparatus being configured to present a control result of the demand response control performed by the facility device, the demand response control result presentation apparatus comprising:
    a communication unit including a network interface configured to acquire information relating to the control result and information relating to an amount of the incentive;
    a computation unit including a CPU configured to calculate a gained amount of incentive; and
    a control result presentation unit including a display configured to present the control result, the control result corresponding to a variation in the gained amount of the incentive in a predetermined period.

2. The demand response control result presentation apparatus according to claim 1, further comprising
    an input device configured to receive setting of a threshold value for the control result,
    the computation unit comparing the control result and the threshold value, and
    the control result presentation unit presenting the control result in accordance with a comparison result.

3. The demand response control result presentation apparatus according to claim 2, wherein
    the energy consumption management system grants an incentive individually to a plurality of users corresponding to a plurality of facility devices,
    the communication unit acquires information relating to the control result of the demand response control performed by a facility device of an other user other than a certain user, and
    the control result presentation unit presents the control result for the certain user based on the information relating to the control result for the other user.

4. The demand response control result presentation apparatus according to claim 2, wherein
    the control result presentation unit presents the control result in a form of any one of or a combination of
    a time during which the facility device performs the demand response control in the predetermined period,
    a number of times that the facility device performs the demand response control in the predetermined period,
    an energy consumption amount adjusted by the demand response control performed by the facility device in the predetermined period,
    an amount of the incentive granted to the user by the demand response control performed by the facility device in the predetermined period,
    a number of control requests received by the facility device in the predetermined period, and
    a number of times that the facility device can respond to the control request in the predetermined period.

5. The demand response control result presentation apparatus according to claim 2, wherein
    the control result presentation unit presents the control result as the amount of the incentive, and the control result corresponds to at least any one of
    a gained amount of money per a unit energy consumption amount adjusted by the demand response control,
    a gained amount of money per number of times that the demand response control is performed,
    a discount amount of money with respect to the unit energy consumption amount paid for by the user, a discount amount of money per a number of times that the demand response control is performed with respect to the energy consumption amount paid for by the user, and a discounted amount of money paid by the user with respect to the unit energy consumption amount.

6. The demand response control result presentation apparatus according to claim 1, wherein the energy consumption management system grants an incentive individually to a plurality of users corresponding to a plurality of facility devices, the communication unit acquires information relating to the control result of the demand response control performed by a facility device of an other user other than a certain user, and the control result presentation unit presents the control result for the certain user based on the information relating to the control result for the other user.

7. The demand response control result presentation apparatus according to claim 6, wherein the control result presentation unit presents the control result in a form of any one of or a combination of a time during which the facility device performs the demand response control in the predetermined period, a number of times that the facility device performs the demand response control in the predetermined period, an energy consumption amount adjusted by the demand response control performed by the facility device in the predetermined period, an amount of the incentive granted to the user by the demand response control performed by the facility device in the predetermined period, a number of control requests received by the facility device in the predetermined period, and a number of times that the facility device can respond to the control request in the predetermined period.

8. The demand response control result presentation apparatus according to claim 6, wherein the control result presentation unit presents the control result in a form of any one of or a combination of a time during which the facility device performs the demand response control in the predetermined period, a number of times that the facility device performs the demand response control in the predetermined period, an energy consumption amount adjusted by the demand response control performed by the facility device in the predetermined period, an amount of the incentive granted to the user by the demand response control performed by the facility device in the predetermined period, a number of control requests received by the facility device in the predetermined period, and a number of times that the facility device can respond to the control request in the predetermined period.

9. The demand response control result presentation apparatus according to claim 6, wherein the control result presentation unit presents the control result as the amount of the incentive, and the control result corresponds to at least any one of a gained amount of money per a unit energy consumption amount adjusted by the demand response control, a gained amount of money per number of times that the demand response control is performed, a discount amount of money with respect to the unit energy consumption amount paid for by the user, a discount amount of money per a number of times that the demand response control is performed with respect to the energy consumption amount paid for by the user, and a discounted amount of money paid by the user with respect to the unit energy consumption amount.

10. The demand response control result presentation apparatus according to claim 1, wherein the control result presentation unit presents the control result in a form of any one of or a combination of a time during which the facility device performs the demand response control in the predetermined period, a number of times that the facility device performs the demand response control in the predetermined period, an energy consumption amount adjusted by the demand response control performed by the facility device in the predetermined period, an amount of the incentive granted to the user by the demand response control performed by the facility device in the predetermined period, a number of control requests received by the facility device in the predetermined period, and a number of times that the facility device can respond to the control request in the predetermined period.

11. The demand response control result presentation apparatus according to claim 1, wherein the control result presentation unit presents the control result as the amount of the incentive, and the control result corresponds to at least any one of a gained amount of money per a unit energy consumption amount adjusted by the demand response control, a gained amount of money per number of times that the demand response control is performed, a discount amount of money with respect to the unit energy consumption amount paid for by the user, a discount amount of money per a number of times that the demand response control is performed with respect to the energy consumption amount paid for by the user, and a discounted amount of money paid by the user with respect to the unit energy consumption amount.

* * * * *